United States Patent [19]
Brotz

[11] Patent Number: 5,921,083
[45] Date of Patent: Jul. 13, 1999

[54] TRI-CLAD THERMOELECTRIC ACTUATOR

[76] Inventor: Gregory R. Brotz, P. O. Box 1322, Sheboygan, Wis. 53081

[21] Appl. No.: 08/775,520

[22] Filed: Dec. 31, 1996

Related U.S. Application Data

[63] Continuation-in-part of application No. 08/532,352, Sep. 22, 1995, Pat. No. 5,588,295, which is a continuation-in-part of application No. 08/349,793, Dec. 6, 1994, abandoned, which is a continuation-in-part of application No. 07/921,631, Jul. 30, 1992, abandoned.

[51] Int. Cl.$^6$ .................................................. F02B 43/00
[52] U.S. Cl. ................................................................ 60/528
[58] Field of Search ........................................ 60/527, 528

*Primary Examiner*—Noah P. Kamen
*Attorney, Agent, or Firm*—William Nitkin

[57] ABSTRACT

A tri-clad metallic semiconductor strip with self-contained heating and cooling to cause the controlled expansion and contraction thereof to more the strip to accomplish work.

2 Claims, 8 Drawing Sheets

TRI-CLAD THERMOELECTRIC ACTUATOR

This application is a continuation-in-part of my previous application entitled Tri-strip Memory Metal Actuator, Ser. No. 08/532,352 filed Sep. 22, 1995, U.S. Pat. No. 5,588,295, which was a continuation-in-part of my previous application entitled Tri-metallic Semiconductor Strip, Ser. No. 08/349, 793 filed Dec. 6, 1994, now abandoned, which was a continuation-in-part of my previous application entitled Bimetallic Strip, Ser. No. 07/921,631 filed Jul. 30, 1992, now abandoned.

BACKGROUND OF THE INVENTION

The device of this invention resides in the area of actuators and more particularly relates to a tri-clad metallic semiconductor strip that incorporates both heating and cooling means within its structure for the control and exact positioning of its shape to act as an actuator to accomplish work.

DESCRIPTION OF THE PRIOR ART

Bi-metallic strips are well known in the prior art and are useful for a variety of purposes. They are made of two pieces of metal that are fused together, each piece having a different temperature coefficient of expansion such that when heated, the bi-metallic strip will bend, such movement thereby controlling a subsequent operation. Bi-metallic strips have been incorporated into many devices such as, for example, an automobile carburetor where a bi-metallic strip coil causes a movable baffle to open upon reaching a certain temperature and to close upon cooling. Bi-metallic strips have also been used to control the operation of windows, ducts, fireplace dampeners, linkages, fire alarms and actuators, and fire sprinklers. Bi-metallic strips have many other uses in industry.

Thermoelectric coolers using the Peltier effect are well known in the prior art and are used in a variety of scientific devices and more recently in consumer products such as picnic coolers.

SUMMARY OF THE INVENTION

It is an object of this invention to provide a tri-clad metallic semiconductor strip with means for the precise control of its linear movement which strip can be utilized in many functional areas such as on circuit boards as an actuating switch. In such tri-clad metallic semiconductor strip with means for the precise control of its linear movement which strip can be utilized in many functional areas such as on circuit boards as an actuating switch. In such tri-clad metallic semiconductor strips, each metal semiconductor has a different temperature coefficient of expansion and such strips also include means for heating and cooling.

Changes in the temperature of a solid body can produce changes in the body's volume, shape and dimensions. These phenomena can be explained as discussed below.

The atoms of a solid vibrate about their equilibrium positions, and the amplitudes of these vibrations change when the temperature of the solid changes. Since vibrations are anharmonic, the frequencies of the vibrations change slightly with the change of temperature, and the mean positions of the atoms will therefore be displaced with respect to neighboring atoms.

The thermal coefficient of linear expansion (or contraction) of a dimension L of a body is:

$$CL = \frac{dL}{L \times dT}$$

where dL is the change in the dimension L produced by a change in temperature dT. The coefficient CL is positive for most ordinary materials; and negative for some unusual materials.

The thermal coefficient of volume expansion is:

$$Cv = \frac{dV}{V \times dT}$$

where V is the volume at temperature T and constant pressure, and dT is the change in temperature. The volume of a solid depends upon the external pressure, but the variations of volume with pressure are extremely small. In a homogenous isotropic solid, CL is the same in all directions, and Cv=3CL. In a non-isotropic solid, such as a crystal, CL may depend upon the direction in which the coefficient is measured.

The "Gruneisen law," derived in 1908 from empirical data, states that the ratio of the coefficient of thermal linear expansion of an isotropic solid to its specific heat per unit volume is approximately independent of temperature.

The device of this invention includes means for heating the hot junction side of its tri-clad metallic semiconductor strip which is used as the heating element and a means for cooling the cold junction side of its tri-clad metallic semiconductor strip, with the heating and cooling occurring simultaneously to varying degrees. The means for cooling the tri-clad metallic strip is based on the Peltier effect where an absorption of heat and, hence cooling, takes place as current is passed from a cold junction to a hot junction through a semiconductor. Electrons passing from the cold junction give up an amount of energy equal to the transport energy and the energy difference between the dissimilar semiconductive materials and cause a cooling effect at the cold junction by having such heat radiate from the hot junction to create thermoelectric cooling. Using three component strips to make a tri-clad metallic semiconductor strip where there is a temperature difference at the junctions due to the Peltier effect will significantly affect the movement in certain ranges of the metal strip sandwich.

The unit acts together as a thermal electric device that needs no means for carrying away heat or touching any heat sink. In one of its simplest embodiments, it exists, for example, as layers of a first strip of copper, a second strip of bismuth, and a lower strip of copper fused together in a sandwich form. By inducing current in one direction, the tri-metallic strip would bend and by having the current go in an opposite direction by switching the poles, the current would cause such strip to bend in the opposite direction to a degree with such movement being useful to activate switches and the like as will be described further below. It should be noted that the terms "tri-clad," "tri-metallic strip," "Tri NPN or PNP semiconductor strip" and "tri-metallic semiconductor strip" are interchangeable and refer to the same structure.

The various embodiments of the tri-metallic strip of this invention can be utilized in a variety of useful structures, for example, switches and even pumps, as illustrated herein. Further, such tri-metallic strips can be utilized in serpentine fashion for linear movement as will be described further below.

DESCRIPTION OF THE PREFERRED EMBODIMENT(S)

Figure 1:
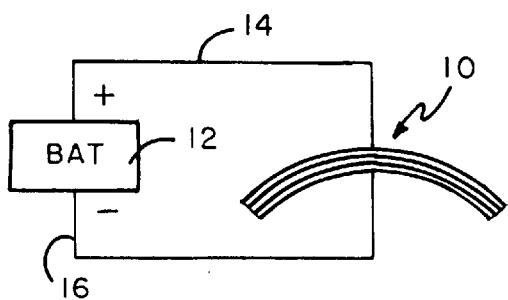
FIG. 1 illustrates a side view of one embodiment of the tri-metallic semiconductor strip of this invention composed of a copper outer layer, a bismuth inner layer and a copper bottom layer with current being passed in one direction therethrough.
Figure 2:
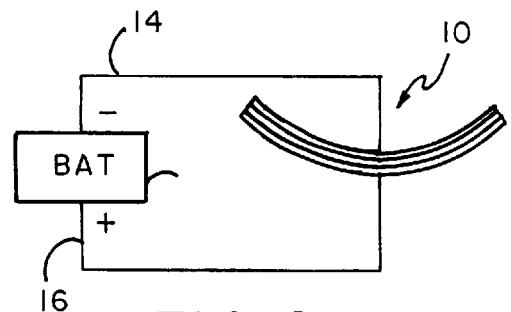
FIG. 2 illustrates a side view of the tri-metallic strip of FIG. 1 with the polarity of the current reversed, showing the strip bent in the opposite direction.
Figure 3:
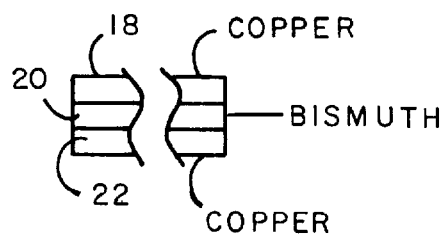
FIG. 3 illustrates a side view of the construction of one embodiment of the tri-metallic strip of this invention.
Figure 4:
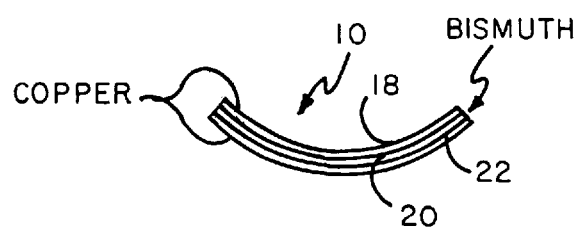
FIG. 4 illustrates a side view of a tri-metallic semiconductor strip showing its NPN structure formed into a complete strip.

FIGS. 3 and 4 illustrate one embodiment of a tri-metallic strip 10 composed of a copper upper strip 18 and copper lower strip 22 sandwiching a bismuth core strip 20. The tri-metallic strip 10 in FIG. 1 is shown having electrical wires 14 and 16 directing current from a battery 12 thereto where the positive terminal is connected to copper upper strip 18 and the negative terminal is connected to copper lower strip 22. In FIG. 2 the polarity of the battery terminals is reversed such that the negative polarity runs through wire 14 to copper upper strip 18 and the positive polarity runs through wire 16 to copper lower strip 22 such that the curve and bend of the tri-metallic strip is opposite to that seen in FIG. 1. Although copper and bismuth are illustrated in FIGS. 1–4, other equivalent metallic semiconductors can be utilized to achieve a desired movement of the tri-metallic strip of this invention.

Some P and N type semiconductors are as follows:

| | Type | FIGURE of Merit |
|---|---|---|
| PbTe | N | 2.8 |
| PbTe | P | 2.2 |
| Bi Te | N | 1.9 |
| Bi Te | P | 1.8 |

Semiconductors have large thermoelectric power compared to plain metals and thus are good substitutes for metals.

Thin film semiconductors can be applied by doping from a gas phase directly onto the metal strips. In some instances a plasma impregnation can be utilized. The doping of coatings from the gas phase is a well known procedure which can be applied to be utilized with materials exhbiting semiconductive properties. The creation of thin layers or films of semiconductive materials is desirable to avoid problems of brittleness and/or cracking as some thicker semiconductors can exhibit crystalline properties. Other methods of applying thin, flexible coatings can be accomplished using pulsed laser annealing. Other annealing techniques, such as heating gaseous semiconductive materials in close contact with a strip of opposite charge so as to attract the gaseous material thereto, can also be utilized. Semiconductive organic films have been prepared by plasma polymerization which films can be utilized in the structure of this invention.

The Peltier effect is dependent on the Kelvin relation; and thus the thermoelectric power (S) must be large to maximize the cooling effect, and the resistivity (p) must be small. This effect will reduce Joule or resistance heating. The thermal conductivity (k) must be small so that a large temperature difference can be maintained. When these material requirements are combined to produce a thermoelectric device, its efficiency is called the "figure of merit" (Z). It has a relationship of:

$$Z = \frac{S}{KP}$$

Figure 5:
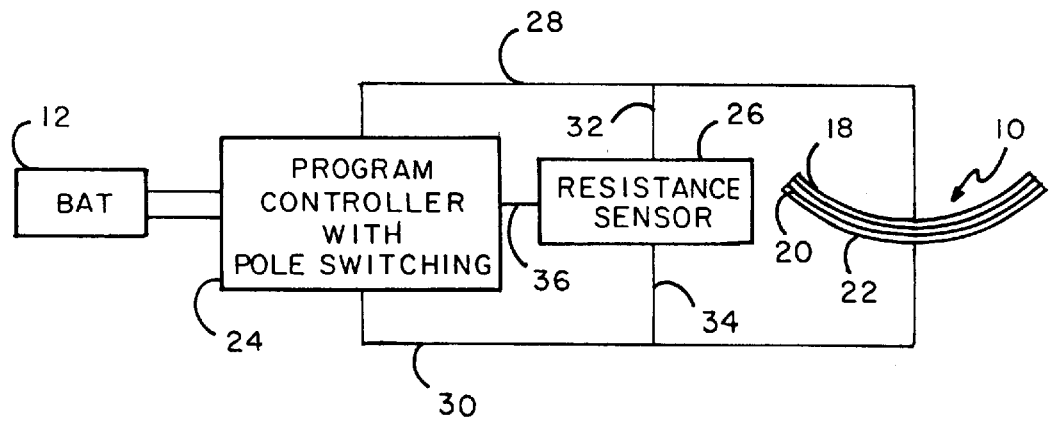
FIG. 5 illustrates a side view of a structure where the current is controlled by polarity switching utilizing a resistance sensor that can determine the positioning of the tri-metallic strip.

FIG. 5 shows a program controller computer 24 with battery pole switching connected through electrical wires 28 and 30 to tri-metallic strip 10, directing current from battery 12 with the ability to reverse the polarity on each side of the tri-metallic strip. A resistance sensor 26 is interconnected to the program controller by wire 36 and interconnected to wires 28 and 30, respectively, by wires 32 and 34. Resistance sensor 26 can sense the amount of electrical resistance through the tri-metallic strip, and the program controller can then calculate such resistance to use it for the positioning of the tri-metallic strip when acting as an actuator. Electrical resistance through the outer metallic strips of the tri-metallic strip is directly proportional to the temperature. Thus, if a resistance reading were taken, it would indicate the temperature of the combined strips of the tri-metallic strip; and thus the exact curved position of the tri-metallic strip could then be determined. The program controller computer takes into account the polarity in combination with the resistance. Assuming that the tri-metallic strip actuator is well burned in, at any temperature such actuator should be at the same position repeatedly so that a mere determination of its temperature will give an indication of its physical position.

Figure 6:
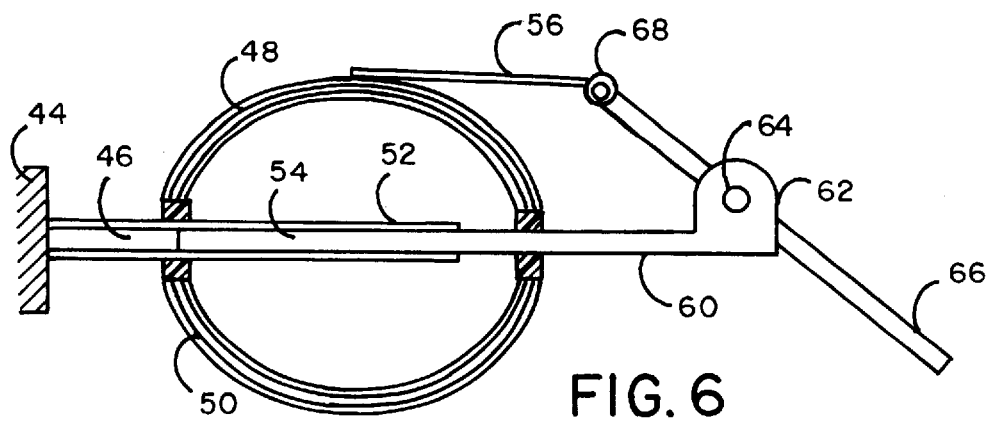
FIG. 6 illustrates a side view of a mechanical actuator in a first position to be actuated by movement of the tri-metallic semiconductor strip of this invention.

FIG. 6 illustrates a side view of two tri-metallic strips which act as an actuator. First tri-metallic strip 48 and second tri-metallic strip 50 are interconnected around a shaft 60 movably contained within shaft receipt member 52. Shaft 60 moves within space 46, defined within shaft receipt member 52, which shaft receipt member is attached to fixed member 44. At the end of shaft 60 is arm receipt member 62 to which arm 66 is pivotally attached by pivot 64. At the upper end of arm 66 is arm pivot 68 which is pivotally attached to attachment member 56 which, in turn, is attached to upper first tri-metallic strip 48 by welding or equivalent means. As first and second tri-metallic strips 48 and 50 have current provided thereto and bend in a deeper curve, as seen in FIG. 6, or allowed to return to a more elongated curve, as seen in FIG. 7, attachment member 56 is moved, respectively, upwards or downwards, which movement causes a pivoting at arm pivot 68 to move arm 66, respectively, upwards or downwards, which mechanical action can be utilized for a variety of purposes.

Figure 7:
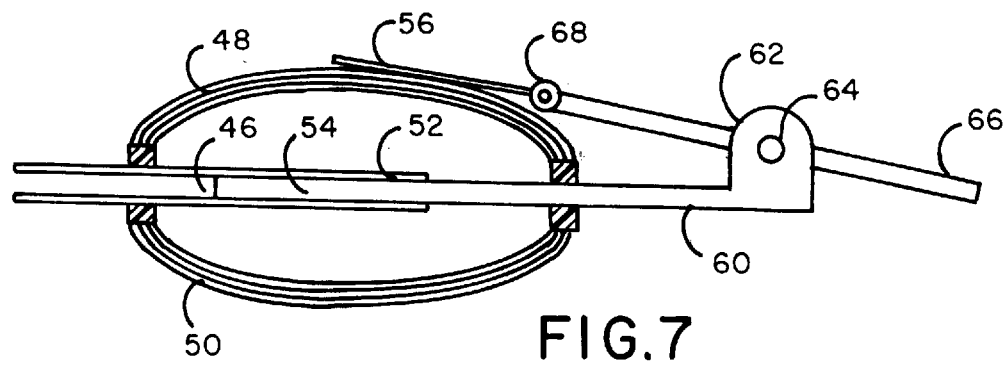
FIG. 7 illustrates a side view of the mechanical actuator of FIG. 6 in a second position having been moved thereto by actuation of the tri-metallic strip.
Figure 8:
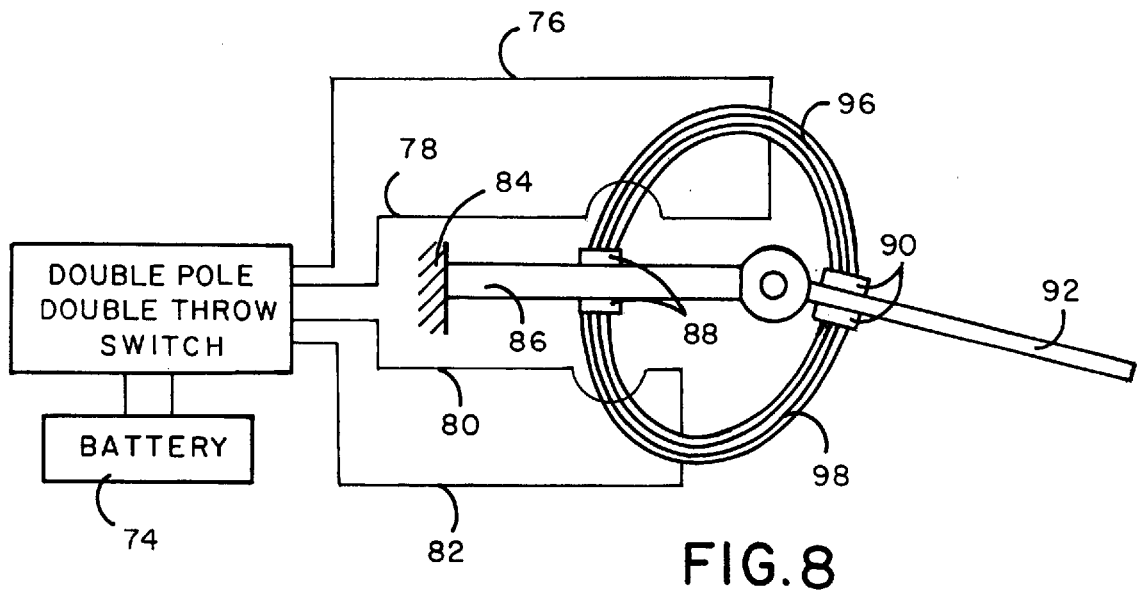
FIG. 8 illustrates a side view of movement of an arm, such movement dependent on the temperatures of two tri-metallic strips.
Figure 9:
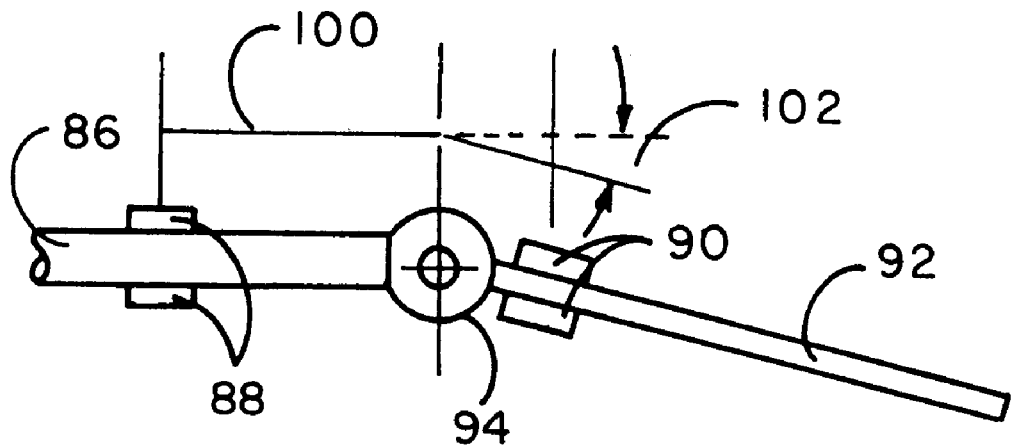
FIG. 9 illustrates a side view of the movement of the arm of FIG. 8 at a first temperature.
Figure 10:
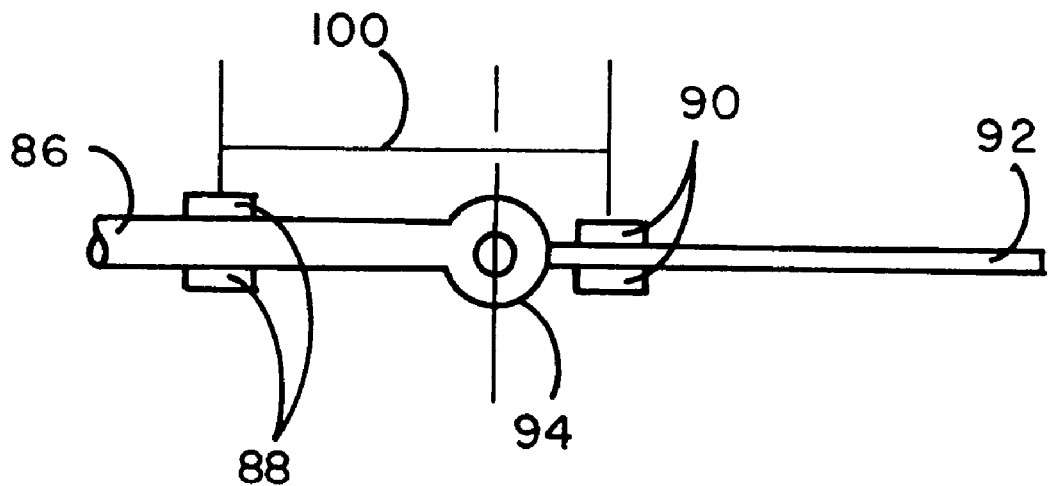
FIG. 10 illustrates a side view of the movement of the arm of FIG. 8 at a second temperature.
Figure 11:
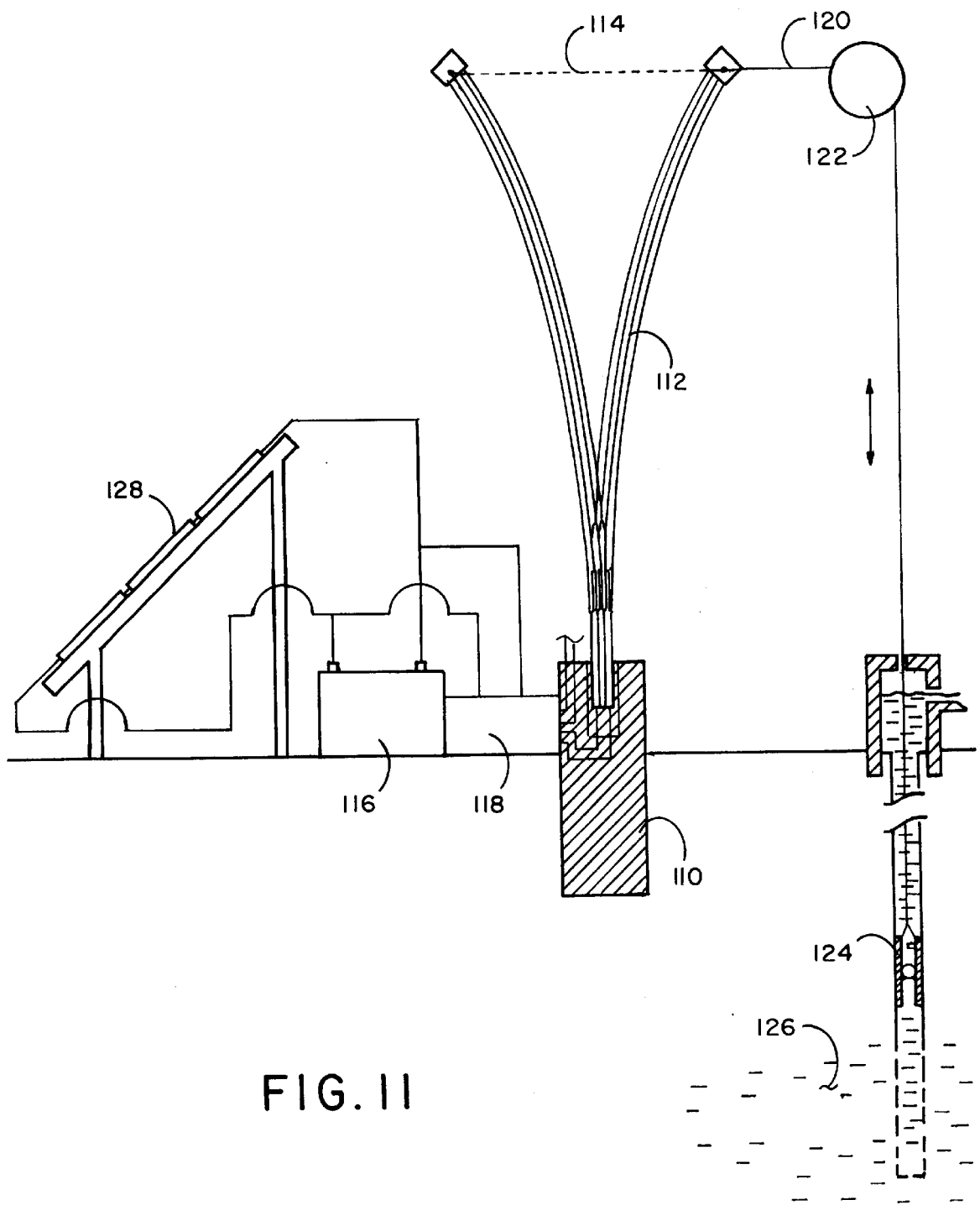
FIG. 11 illustrates a side view of the movement back and forth of a tri-metallic strip with different currents directed thereto for purposes of mechanically moving a wire over a pulley to perform work, such as pumping ground water continuously, where the electricity is provided by a photovoltaic solar array and where the motor action is totally solid-state dictated only by the movement of the tri-metallic strip.

Similar to the actuator seen in FIGS. 6 and 7 is the one shown in FIG. 8 wherein upper tri-metallic strip 96 and lower tri-metallic strip 98 are attached to shaft 86. The direction of current through electrical wires 76 and 78 to upper tri-metallic strip 96 and through wires 80 and 82 to lower tri-metallic strip 98 causes the upper strip to expand and the lower strip to contract, which expansion/contraction in turn causes movement of shaft receipt members 88 and arm receipt member 90 such that the angle of arm 92 to shaft 86 can be changed. Angle 102 of movement of arm 92, seen in FIG. 9, shows the displacement of arm 92 from horizontal line 100. In FIG. 10, for purposes of illustration, the upper and lower tri-metallic strips have been deleted to show that arm 92 has moved to a horizontal position. Such angular movements are useful in a wide variety of situations. An example of such a situation can be seen in FIG. 11 which shows tri-metallic strip 112 extending upwards from base 110. Tri-metallic strip 112 can move back and forth along horizontal path 114 and can receive electrical current from battery 116 through control switch 118 to cause such movement. The movement, for example, can pull line 120 over pulley 122 to move one-way valve pump 124 to lift ground water 126. Such a system would be especially useful in an environment such that photovoltaic solar array 128 can be used to recharge battery 116 during daylight hours for the device's operation to continue during the hours of darkness. Such one-way valve pumps are especially useful to move water in certain geographical areas and situations where electrical current, gasoline motors, and other power sources are not available. In such embodiment the tri-metallic strip of this invention forms the key part of a solid-state pump that is extremely economical to operate and which requires low maintenance.

Figure 12:
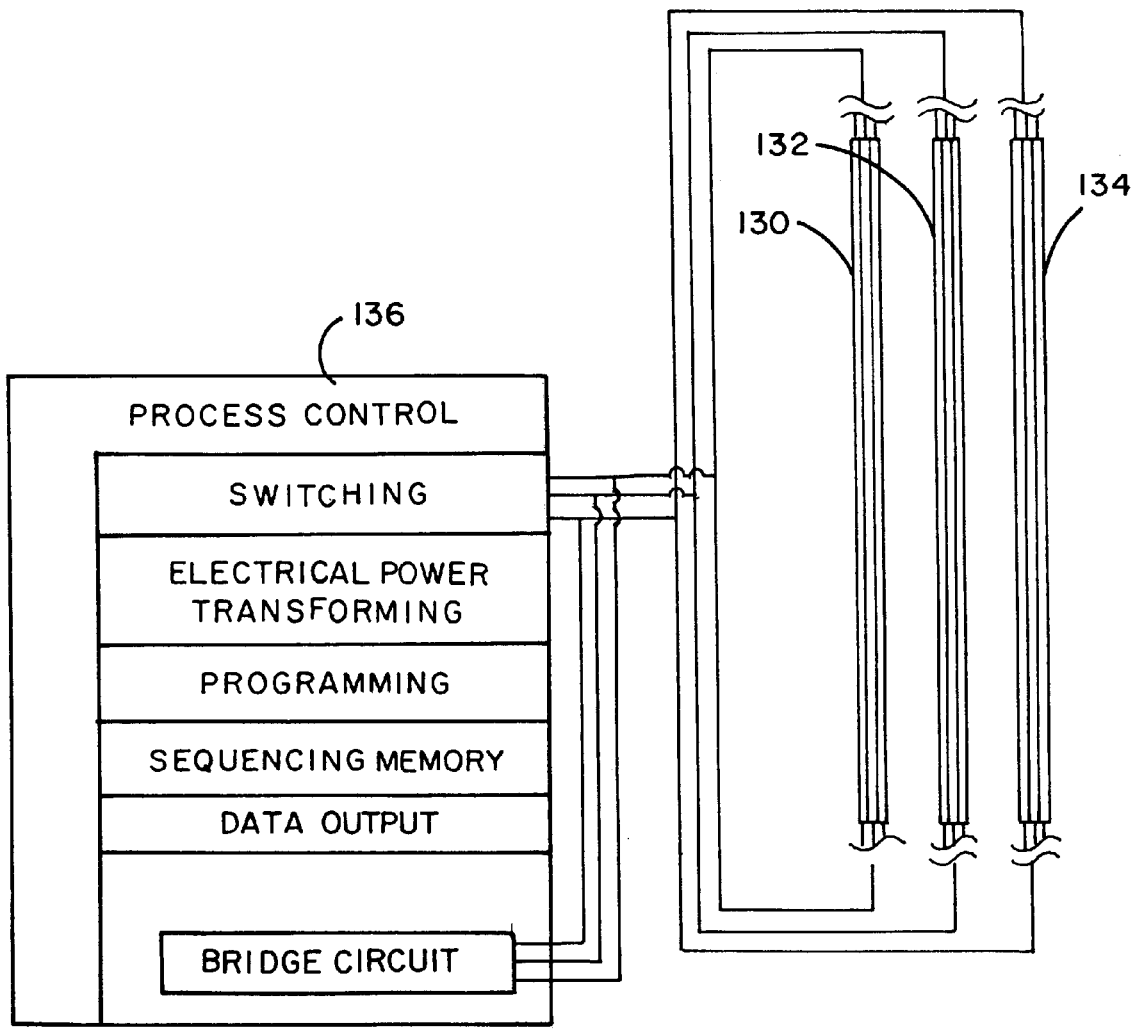
FIG. 12 illustrates a side view of a plurality of tri-metallic strips through which a sequencing memory will direct a process controller to direct power to each to cause each to bend in a desired fashion.

FIG. 12 illustrates three tri-metallic strip actuators 130, 132 and 134 which are interconnected to process controller 136 such that they can act in concert with one another to perform one or more tasks. Process controller 136 can be a computer that will calculate information about the position of each actuator by sensing the resistance through the outer strips of each actuator wherein such electrical resistance, as described above, is proportional to its temperature. Process controller 136 can then determine the position of each actuator by the determination of such resistance.

Figure 13:
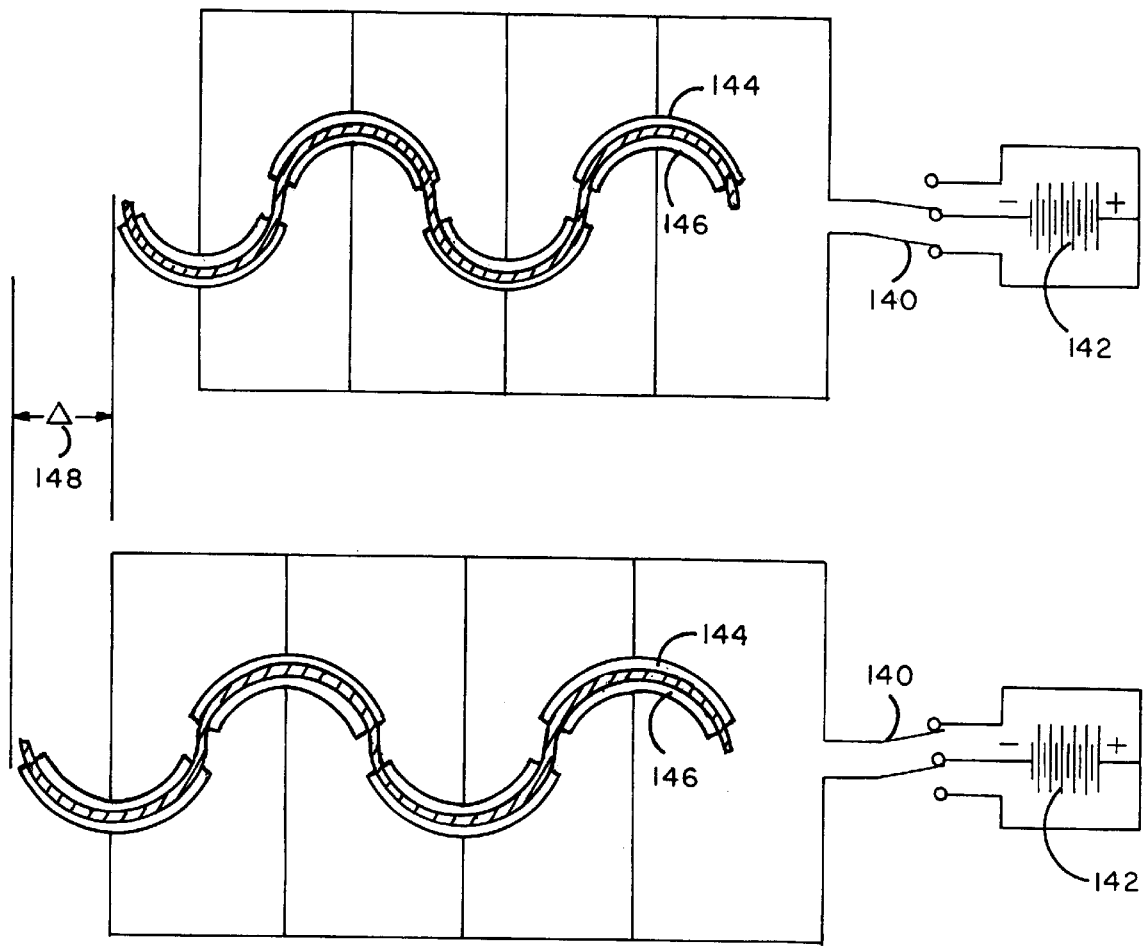
FIG. 13 in its upper portion illustrates a side view of a first embodiment of a serpentine tri-metallic strip in a first position, and in its lower portion, illustrates the same tri-metallic strip receiving current from the power source having a reversed polarity, causing the strip to extend a distance, delta, to a second position.
Figure 14:
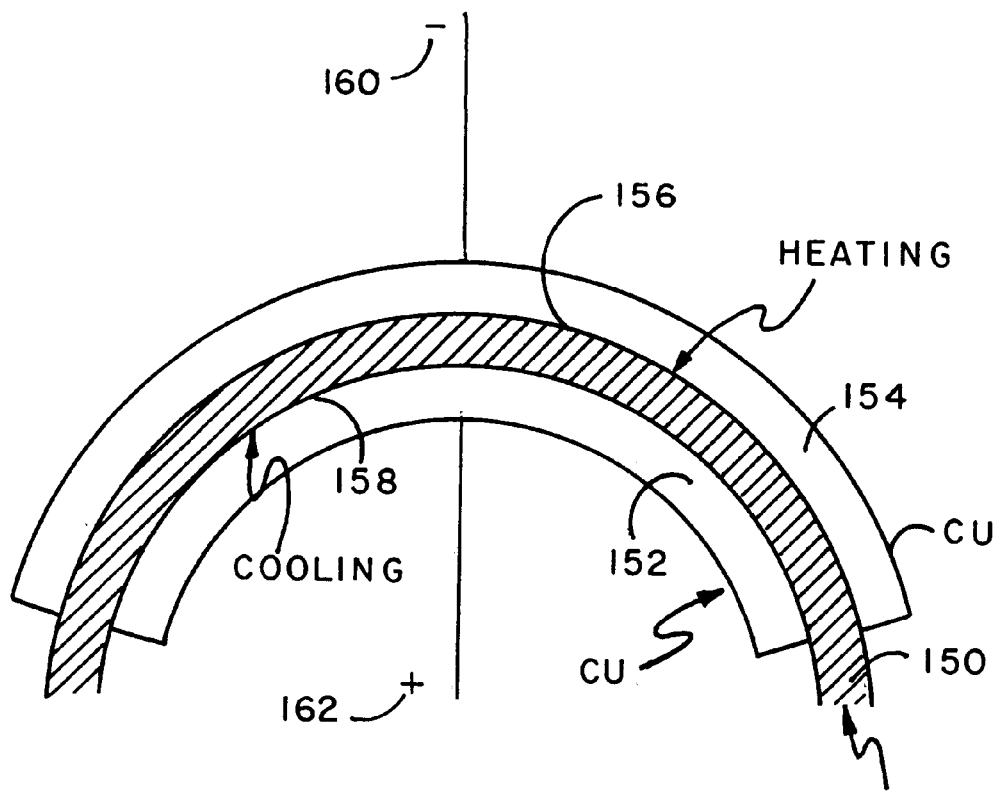
FIG. 14 illustrates a side view of one embodiment of the tri-metallic strip having a bismuth core and clad with two copper strips, being heated on one exterior side and cooled on the other exterior side.
Figure 15:
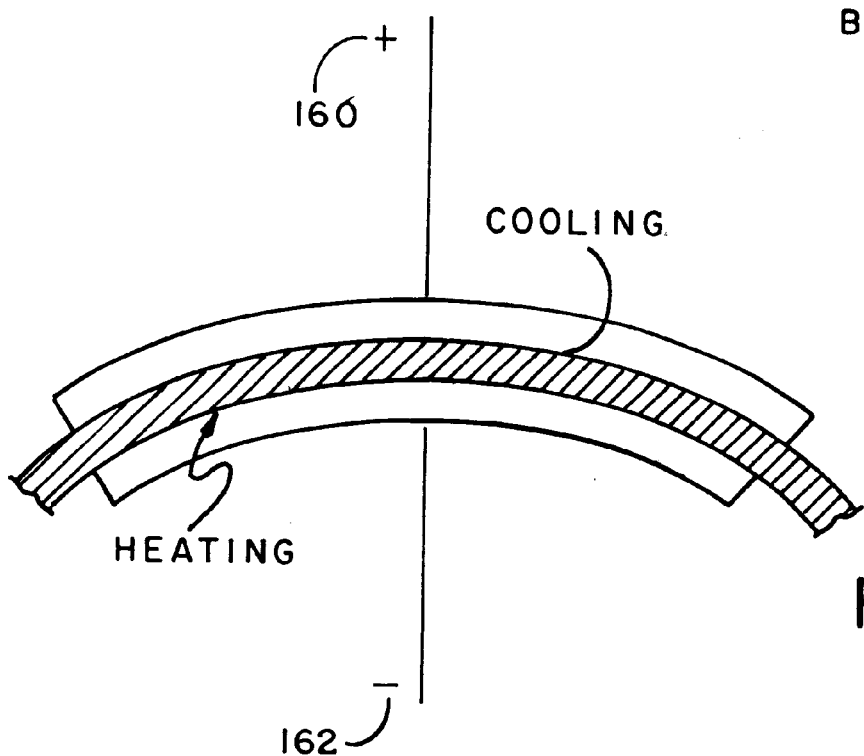
FIG. 15 illustrates a side view of the tri-metallic strip of FIG. 14 after a temperature change, causing straightening of the strip to increase its length.

Another practical embodiment of the tri-metallic strip of this invention is seen in FIG. 13 wherein in the upper portion of this Figure a double-pole throw switch 140 directs power from power supply 142 at one polarity to the upper and lower strips of the serpentine tri-metallic strip and when the power polarity is reversed, as seen in the bottom portion of FIG. 13, the tri-metallic strip expands, thereby changing its length a distance, delta 148. A typical structure of a portion of such a strip is seen in FIG. 14 where bismuth strip 150 is sandwiched between two copper strips 152 and 154. Heating junction 156 is located on the upper portion of strip 150 and the cooling junction 158 is located on its lower portion such that when electrical polarity 160 and 162 is changed therethrough, the tri-metallic strip straightens, as seen in FIG. 15, which movement can be used to produce work.

Figures 16, 17:
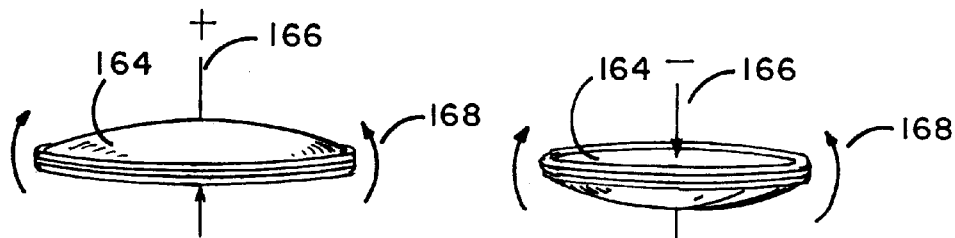
FIG. 16 illustrates a perspective view of a further embodiment of this invention being a tri-metallic disk bending in one direction, indicated by arrows, based on the polarity of currents running thereto.
FIG. 17 illustrates a perspective view of the tri-metallic disk of FIG. 16, being in the opposite direction as seen in FIG. 16 after the polarity has been reversed.

The same type of movement can be obtained from the embodiment of this invention illustrated in FIGS. 16 and 17 wherein a tri-metallic disk is illustrated. When disk 164 has a current polarity 166 running in one direction, as seen in FIG. 16, its direction of movement is upwards as indicated by arrow 168. When the current polarity is changed, disk 164 bends downward as indicated by arrow 168 in FIG. 17.

Figure 18:
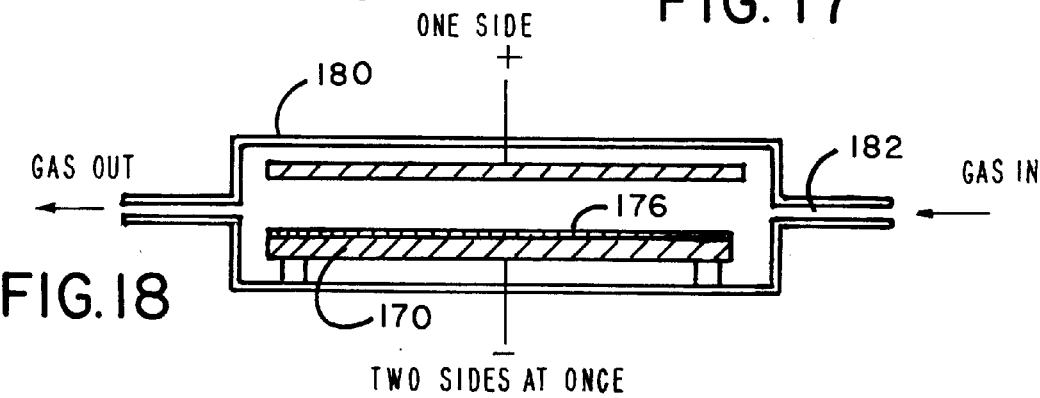
FIG. 18 illustrates a side view of a chamber with semiconductive material being coated onto one side of a strip.
Figure 19:
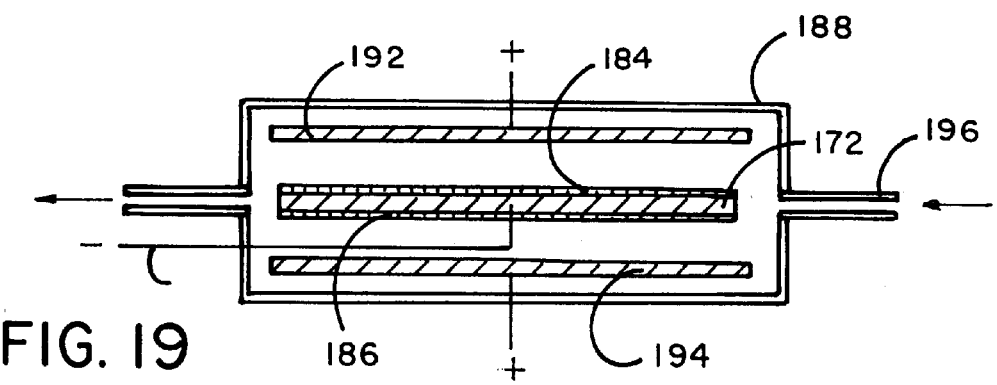
FIG. 19 illustrates a side view of a chamber with semiconductive material being coated onto both sides of a strip.
Figure 20:
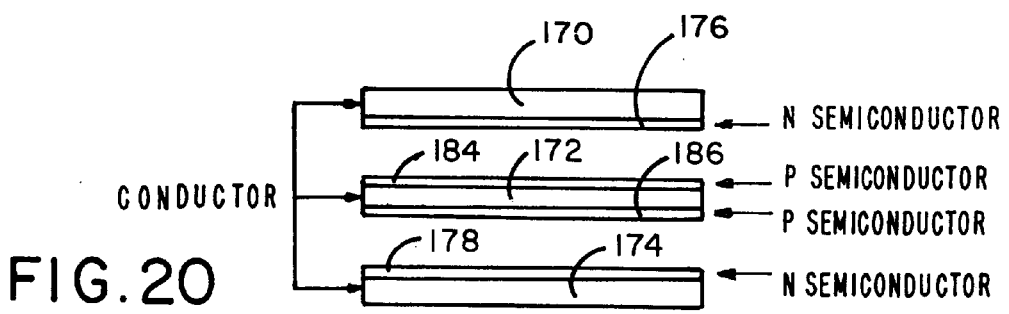
FIG. 20 illustrates a side view of the components of a tri-clad strip separated from one another.
Figure 21:
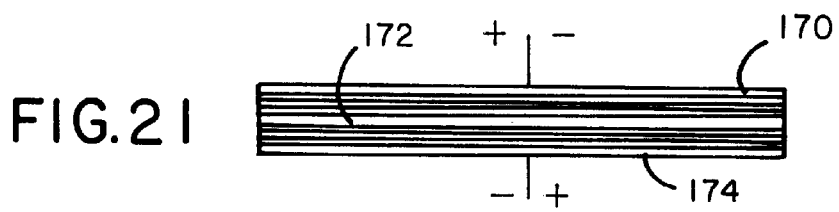
FIG. 21 illustrates a side view of the tri-clad strip of FIG. 20 with its components compressed together.

FIG. 21 illustrates an alternate embodiment of the tri-clad thermoelectric actuator utilizing three conductor strips, the first conductor strip being 170 having an N-type semiconductor doped on one surface by plasma impregnation, the semiconductor being of the thin, flexible type. FIG. 18 illustrates the application of a thin layer of N-type semiconductor 176 being applied to metal strip 170 where it is applied coming in to chamber 180 through gas line 182 and attracted by an opposite electrical charge and by plasma impregnation to be doped onto the surface of metal strip 170 by electrical attraction thereto. A similar procedure is followed with strip 174, as seen in FIG. 20, having an N-type semiconductor layer 178 applied thereto. Central metal strip 172, seen in FIG. 20, can have both sides thereof doped at the same time by a P-type semiconductor coating layers 184 and 186 on each side thereof in chamber 188 where central strip 172 has a negative charge 190 applied thereto, being contained between two positively charged plates 192 and 194 such that when the gas enters chamber 188, as seen in FIG. 19, through pipe 196, P-type semiconductor coatings are doped on each side of strip 172 such that when strip 172 is later positioned between strips 170 and 174, a sandwich, as seen in FIG. 21, can be created when the strips are compressed together which will flex in a selected direction dependent upon the polarities of current applied to each side as described above. The use of thin, flexible semiconductor layers aids in providing flexibility to the final product.

Although the present invention has been described with reference to particular embodiments, it will be apparent to those skilled in the art that variations and modifications can be substituted therefor without departing from the principles and spirit of the invention.

I claim:

1. A tri-metallic strip actuator comprising:
   a tri-metallic strip including:
   a first metal strip, a second metal strip and a third metal strip, each of said metal strips having a different coefficient of expansion from the other, said metal strips being fused together, said first metal strip made of a P-type semiconductor, said second metal strip being a conductor having a lower coefficient of expansion than that of said first metal strip, said third metal strip being of an N-type semiconductor having a lower coefficient of expansion from that of said second metal strip;
   an electrical current power source;
   means to heat said first metal strip, said second metal strip and said third metal strip by applying electrical current at a first polarity thereto from said power source; and
   means to cool said first metal strip, said second metal strip and said third metal strip, said means including thermoelectric cooling utilizing one of said metal strips as a cold junction, said thermoelectrically cooled strip receiving electric current having a reversed polarity from the polarity of the electrical current when said electrical current is used for heating said metal strips, said heating and cooling to create desired movement of said tri-metallic strip.

2. A tri-metallic strip actuator comprising:
   first, second and third conductive metallic strips, each having an inner and an outer side;
   said first metallic strip, second metallic strip and third metallic strip each having a different coefficient of expansion from the other, said metallic strips being clad with semiconductive material and fused together, said first metallic strip clad on its inner side with an N-type semiconductor, said second metallic strip being a conductor having a lower coefficient of expansion than that of said first metallic strip and clad on both sides with a P-type semiconductor, said third metallic strip being clad on its inner side with a N-type semiconductor, said third metallic strip having a lower coefficient of expansion from that of said second metallic strip;
   an electrical current power source;
   means to heat said first metallic strip, said second metallic strip and said third metallic strip by applying electrical current at a first polarity thereto from said power source; and
   means to cool said first metallic strip, said second metallic strip and said third metallic strip, said means including thermoelectric cooling utilizing one of said metallic strips as a cold junction, said thermoelectrically cooled strip receiving electric current having a reversed polarity from the polarity of the electrical current when said electrical current is used for heating said metallic strips, said heating and cooling to create desired movement of said tri-metallic strip actuator.

* * * * *